UNITED STATES PATENT OFFICE.

BURT S. HARRISON, OF BROOKLYN, NEW YORK, ASSIGNOR TO CARRIER ENGINEERING CORPORATION, OF NEW YORK, N. Y.

METHOD OF DRYING FOOD PRODUCTS.

1,414,275. Specification of Letters Patent. Patented Apr. 25, 1922.

No Drawing. Application filed April 19, 1919. Serial No. 291,204.

*To all whom it may concern:*

Be it known that I, BURT S. HARRISON, a citizen of the United States, residing at Brooklyn, in the county of Kings and State of New York, have invented a new and useful Improvement in Methods of Drying Food Products, of which the following is a specification.

This invention relates to the drying of fruits and other food products, and more particularly to the destruction of mold spores and the consumption of mold of the kind which forms on fruits and other food products when the process of slow drying has been interrupted.

In certain localities, food products, such for example as raisins, prunes and other fruits are dried in the open air, by spreading out the product in trays over large tracts of land, often many thousands of acres in extent. If, in such cases, rain falls and wets the product before the drying is completed, mold appears in a few days, and, unless the mold spores are killed, heavy loss results from the injury to the product. This mold is of a superficial character. It grows on the surface of the product, and while it grows slowly it reproduces very rapidly, so that, once started, it quickly covers the fruit. The spores can be almost instantly killed and the mold consumed by the application of heat of sufficiently high temperature. The product could therefore be saved if it could be quickly gathered and put through a drier. But it is obviously impracticable to gather the product from thousands of acres of land and pass it through a drying plant. The labor alone, even if available, would be a tremendous expense, and the transportation and handling would ruin a large part of the product, particularly at certain stages of the drying process. The cost of a drying plant of sufficient capacity to be effective would be prohibitive and the plant would be in use only once or twice possibly in a long period of time. The depreciation and fixed charges of such a plant would therefore constitute a considerable overhead to be carried by the producer.

The object of this invention is to provide a practical and efficient method by which the mold spores can be killed and the mold consumed quickly in an economical manner without handling or transporting the product from the drying fields.

According to this method when mold occurs on the fruit or product, due to its exposure to rain or from other cause, the product, without being handled or transported from the drying fields, is singed or subjected momentarily, or for a very brief period of time, to a naked flame or blast of air or other suitable gaseous medium of a temperature high enough to kill the mold spores, and preferably to also consume the mold. Preferably the fruit, when picked, is placed in thin layers on trays on the ground in straight rows between the trees or vines and the flame is applied by a blow torch mounted on wheels or otherwise, adapting it to be conveyed steadily along the rows of trays so that the flame is projected over or against, and between the fruit on the trays. In this way the mold spores are killed substantially instantly, and the mold quickly consumed, while the fruit, due to its weight, volume and specific heat, is not deleteriously affected by the application of the flame or hot blast for the relatively short period of time.

By this method no handling of the fruit is necessitated, no expensive equipment is required and one person can treat many acres of fruit or other product in a day.

I claim as my invention:

The hereindescribed method of drying fruit and analogous food products, consisting in exposing the products to the atmosphere in thin layers in rows in the open field, then destroying any mold spores appearing on the products by singeing the product by means of a flame or hot blast, and permitting the products to remain exposed until the drying is complete.

Witness my hand this 17th day of April, 1919.

BURT S. HARRISON.

Witnesses:
 H. O. ARGÜELLO,
 AGNES T. GRAY.